United States Patent [19]

Pao et al.

[11] Patent Number: 5,560,951
[45] Date of Patent: Oct. 1, 1996

[54] NONENZYMATIC FRUIT PEELING METHOD

[75] Inventors: Shi-Chiang Pao, Winter Haven; Peter D. Petracek, Auburndale; G. Eldon Brown, Winter Haven, all of Fla.

[73] Assignee: University of South Florida, Tampa, Fla.

[21] Appl. No.: 396,915

[22] Filed: Mar. 1, 1995

[51] Int. Cl.⁶ .................................. A23N 7/00
[52] U.S. Cl. .................. 426/482; 426/478; 426/479; 426/481; 426/506
[58] Field of Search .................. 426/308, 506, 426/478, 479, 481, 482

[56] References Cited

U.S. PATENT DOCUMENTS

| | | | |
|---|---|---|---|
| H950 | 8/1991 | O'Brien et al. | 426/639 |
| 1,601,027 | 9/1926 | Lefevre et al. | 426/287 |
| 3,031,307 | 4/1962 | Blakemore | 49/100 |
| 3,347,678 | 10/1967 | Villadsen et al. | 99/103 |
| 3,607,316 | 9/1971 | Hume | 99/204 |
| 3,970,762 | 7/1976 | Askienazy et al. | 426/287 |
| 4,284,651 | 8/1981 | Bruemmer | 426/50 |
| 5,000,967 | 3/1991 | Adams et al. | 426/50 |
| 5,196,222 | 3/1993 | Kirk | 426/482 |
| 5,200,217 | 4/1993 | Elliott et al. | 426/50 |
| 5,231,921 | 8/1993 | Kirk | 99/537 |

FOREIGN PATENT DOCUMENTS 51-110056  3/1975  Japan.

OTHER PUBLICATIONS

Joseph H. Bruemmer, Alicia W. Griffin, "Sectioning Grapefruit by Enzyme Digestion", *Proc. Fla State Hort. Soc.* 91, pp. 112–114, 1978.

R. A. Baker and J. H. Breummer, "Quality and Stability of Enzymically Peeled and Sectioned Citrus Fruit", *American Chemical Society Symposium Series 405*, Chap. 12, pp. 140–148, 1989.

*Primary Examiner*—Esther M. Kepplinger
*Assistant Examiner*—Lien Tran
*Attorney, Agent, or Firm*—Allen, Dyer, Doppelt, Franjola & Milbrath, P. A.

[57] ABSTRACT

A method of pretreating citrus fruit for facilitating peeling utilizes water infusion without enzymes for loosening the peel from the underlying segments. The infusion may be accomplished with the use of a pressure or a vacuum apparatus. A further embodiments, which may be used in the home, consists of cutting a pair of opposed holes in the peel and forcing water into one of the holes until it emerges from the other hole. Both embodiments serve to separate the peel from the segments, making the fruit easier to peel.

6 Claims, 5 Drawing Sheets

NONENZYMATIC FRUIT PEELING METHOD

BACKGROUND OF INVENTION

1. Field of the Invention

The present invention relates to peeling methods for fruits, and, more particularly, to nonenzymatic peeling methods for citrus fruit.

2. Description of Related Art

An enzymatic peeling process is currently used to produce peeled citrus fruit that are convenient for consumption (Bruemmer et al., Proc. Florida State Hort. Soc. 91:112-14; Bruemmer, U.S. Pat. No. 4,284,651; Adams et al., U.S. Pat. No. 5,000,967). By this process, fruit are scored or abraded and infused either with pectinase or with pectinase and cellulase solution by vacuum or pressure and are incubated at 20°–45° C. for 0.5–2 h. During the incubation period, the enzymes digest pectin and cellulose in the albedo (the inner part of the peel) and the regions of the intersegment membranes and thus facilitate the separation of fruit from peel and sectioning of the fruit.

Commercially available enzymatically peeled citrus fruit exhibit juice leakage and softening during storage in spite of apparent preservation of the integrity of segment membranes and juice vesicles. Although the quality of these fruit may be extended by low temperature and controlled-atmosphere storage and incorporation of chemicals such as calcium lactate, it was suspected that the observed loss of quality is caused in part by an inadvertent infusion of the enzyme(s) into the fruit and a subsequent catabolism of the flesh throughout the storage period.

SUMMARY OF THE INVENTION

It is therefore an object of this invention to provide a method of pretreating citrus fruit for facilitating peeling.

It is an additional object to provide such a method that preserves fruit quality.

It is a further object to provide such a method that maintains the hydration level of the fruit.

It is another object to provide such a method that preserves fruit firmness.

It is yet an additional object to provide such a method that preserves taste quality.

It is yet a further object to provide such a method that preserves fruit appearance.

It is yet another object to provide such a method that produces fruit having a longer shelf life.

It is another object to provide an in-home method of pretreating fruit for peeling that is simple to implement and preserves fruit quality.

The method for pretreating a citrus fruit for facilitating peeling of the present invention satisfies the above and other objectives.

Citrus fruit in general comprises a plurality of radial segments surrounded by a peel that consists of a cuticle (outer, colored peel portion) and an albedo (inner, white peel portion). Different varieties of citrus are known to be more or less difficult to peel, and to have more or less albedo, which is desired to be removed for effective peeling. The method presented herein addresses both of these problems without the introduction of enzymes into the fruit, which can cause the above-listed disadvantages in the resultant peeled fruit.

A first embodiment of the method, which is contemplated four use in mass production, comprises the steps of scoring the fruit to break the cuticle and infusing the fruit with a solution comprising water having essentially no enzyme therein.

A second embodiment of the method, which is contemplated for use in the home or on individual fruit, for example, on an assembly line, comprises the steps of making a first hole and a second hole or cut in the cuticle of the fruit. Next a water tube is applied to the first hole, the tube having a radius dimensioned to closely engage the first hole. Finally, the fruit is infused with a solution comprising water having essentially no enzyme therein from the tube at a sufficient pressure that the solution exits from the second hole or cut. It has been found that sufficient pressure may be obtained from a conventional water faucet to accomplish the desired pretreatment.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 2 illustrates the steps in pretreating a citrus fruit using a vacuum method: (a) holding the fruit at a predetermined temperature in water; (b) scoring the fruit; (c) placing the fruit in water under a vacuum; (d) releasing the vacuum.

FIG. 3 illustrates the steps in pretreating a citrus fruit using a high-pressure method: (a) scoring the fruit; (b) placing the fruit in water under pressure.

FIG. 4 shows the juice leakage of citrus fruit pretreated by water and enzyme vacuum-infusion methods during storage: (a) 'Hamlin' oranges; (b) white 'Marsh' grapefruit.

FIG. 5 shows the microbial contamination of citrus fruit peeled by water- and enzyme-vacuum-infusion methods during storage: (a) 'Hamlin' oranges; (b) white 'Marsh' grapefruit.

FIG. 6 illustrates a simplified water-infusion method of pretreating citrus fruit for peeling: (a) making holes in the fruit; (b) applying a water tube to one hole; and (c) infusing the fruit with water.

DETAILED DESCRIPTION OF THE PREFERRED EMBODIMENTS

Figure 1:
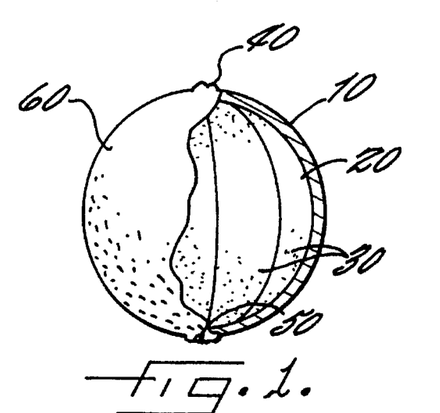
FIG. 1 is a schematic illustration of the parts of a citrus fruit.

A description of the preferred embodiments of the present invention will now be presented with reference to FIGS. 1–6. schematic diagram of a citrus fruit, illustrating the pertinent parts, is given in FIG. 1. Shown are the peel, or cuticle, 10, albedo 20, segments 30, blossom end 40, and stem end 50 of the fruit 60. Specific citrus fruit used in the studies to be described herein include white 'Marsh' grapefruit, Ruby red grapefruit, 'Hamlin' oranges, and 'Orlando' tangelos, but no limitation is to be implied by the use of these varieties. The fruit used in the studies were obtained prior to washing and waxing, but were washed on the peeling date. The fruit surfaces were not sterilized.

Embodiment One

Figure 2A:
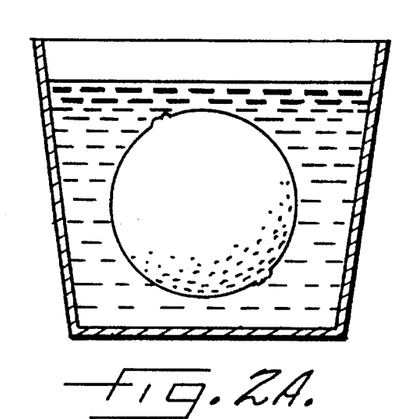
Figure 2B:
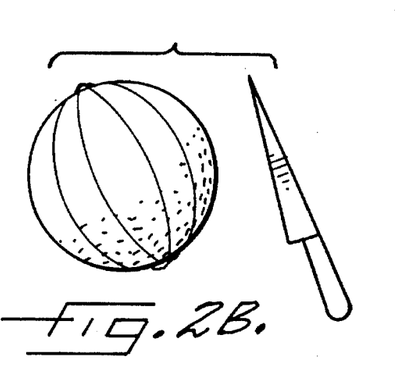
Figures 2C, 2D:
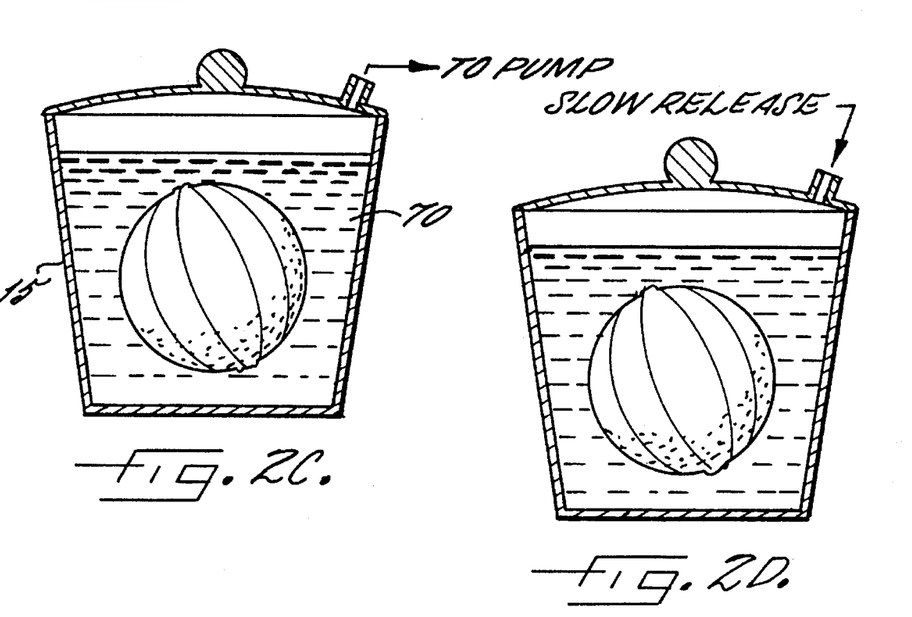
Figure 3A:
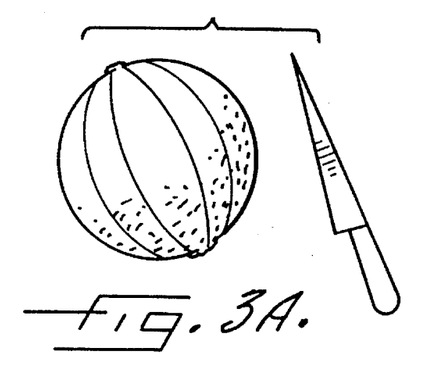
Figure 3B:
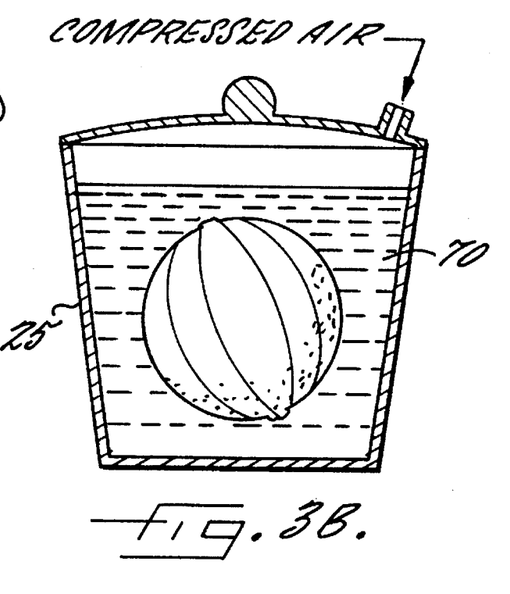

A preferred embodiment of the method of the present invention for pretreating a citrus fruit, as illustrated in FIGS. 2 and 3, for facilitating peeling generally comprises the steps of scoring the fruit 60 to break the cuticle 10 and infusing the fruit with a solution 70 comprising water having essentially no enzyme therein. The solution utilized in the studies to be discussed herein consists essentially of only water.

A first step preferably comprises holding the fruit in water at a predetermined treatment temperature for approximately 30 minutes before scoring and infusion [FIG. 2(a)], and further adjusting the infusion welter to the predetermined treatment temperature. The treatment temperature is a variable in the studies, and will be discussed further below.

Studies of a variety of scoring patterns were undertaken, with the result that the most consistent results were obtained by making a plurality of radial cuts from the stem end to the blossom end, the plurality of radial cuts preferably comprising six radial cuts 75 [see FIGS. 2(b) and 3(a)].

Comparative tests were undertaken using the above-cited enzymatic methods and the method of the present invention. In the tables and figures, "Enzyme 1" refers to pectinase Spark-L HPG; "Enzyme 2," to pectinase Clarex-L (both from Solvey Enzymes, Inc., Elkhart, Indiana). The enzyme solutions were prepared with distilled and deionized water to, respectively, 500 and 1000 ppm, as recommended in the literature. The solutions were poured into the desired chambers, and 5–10 scored fruit were weighted down in the solution to ensure complete coverage.

Vacuum Infusion. In the vacuum infusion method, the chamber comprises a 5-L desiccator 15, which is preferably pumped down to approximately 3 kPa for 3 minutes. The pump was then turned off, and the vacuum was slowly released over a period of approximately 3 minutes.

Pressure Infusion. In the pressure infusion method, the chamber comprises a 10-L pressure cooker 25, which is preferably filled with compressed air to a high pressure of approximately 203 kPa. The fruit is subjected to this high pressure for a plurality of predetermined time periods, comprising approximately 10 consecutive periods of approximately 15 seconds each.

In the vacuum and pressure methods, fruit infused with enzyme were removed from their chambers and incubated for 30 and 60 min, respectively, preferably at the predetermined treatment temperature. It was found that water-infused fruit did not benefit from an incubation period; so these fruit could be peeled immediately following infusion.

Solution-infusion studies have been undertaken on peeling time, juice loss, visual appearance, firmness, microbial stability, and rates of respiration and ethylene emanation. Fruit used in studies on the effects of solution composition on juice loss, visual appearance, firmness, microbial stability, and rates of respiration and ethylene emanation were peeled, rinsed for 10 sec, placed in 0.75-L plastic containers, and held at temperatures of 5, 10, or 15° C. Four 1-cm slits were cut into the plastic containers to prevent anaerobic respiration (container gas levels ranged from 16 to 20% $O_2$ and 1.5 to 3% $CO_2$). No additional attempt was made to control or modify the atmosphere in these studies.

Peeling Time Studies. The effects of infusion solution composition, infusion method, and temperature on peeling characteristics have been quantified by determining the time required for four peelers wearing gloves to remove the peel from five fruit each. Peeling was judged to be complete when the peels, albedo, and most loosened fibers were removed from the flesh.

White and red grapefruit infused with enzyme solution had peeling times that were about 10-20% faster than water-infused fruit, as shown in Tables 1 and 2. However, the enzyme treatment did not improve peeling time for oranges and tangelos. For all varieties, the peels of enzyme-treated fruit were noticeably softer than water-treated fruit. For grapefruit, the primary benefit of the enzyme for peeling time, however, was probably that the pectinase digested and promoted the removal of the thick layer of albedo and fiber. This hypothesis is supported by studies on enzyme effects of peeling times in which albedo and fibers were left on the fruit. The removal times for peel only (about 15, 17, 10, and 12 sec/fruit for white and red grapefruit, orange, and tangelo, respectively) were not affected by enzyme treatment (data not shown).

As mentioned, peeling times were not improved for oranges and tangelos by using enzyme infusion. Further studies in which incubation was extended beyond 6 h did not improve the peeling process. Water apparently acts as the primary agent in loosening the peel. Infiltration of the albedo with water hydrates and probably solubilizes the pectin enough to promote sufficient disintegration of the albedo and a general loss of peel integrity. Similarly, it is known that enzyme was not required for the separation of onion pieces (Hume, U.S. Pat. No. 3,607,316).

TABLE 1

Effects of enzyme and temperature on peeling time of grapefruit, oranges, and tangeloes.

| | | Peeling time (sec/fruit) | | | |
|---|---|---|---|---|---|
| Infusion solution | Temperature (°C.) | White grapefruit | Red grapefruit | Hamlin orange | Orlando tangelo |
| Enzyme 1[a] | 25 | 44 ± 7[b] | 66 ± 9 | 26 ± 4 | 27 ± 5 |
| Enzyme 2 | 25 | 47 ± 6 | 56 ± 4 | 25 ± 2 | 22 ± 2 |
| Enzyme 1 | 45 | 42 ± 2 | 48 ± 3 | 22 ± 2 | 18 ± 2 |
| Enzyme 2 | 45 | 42 ± 8 | 47 ± 4 | 24 ± 2 | 19 ± 1 |
| Water | 5 | 57 ± 4 | 81 ± 10 | 27 ± 3 | 50 ± 12 |
| Water | 15 | 59 ± 3 | 69 ± 7 | 23 ± 4 | 36 ± 6 |
| Water | 25 | 54 ± 6 | 67 ± 7 | 26 ± 5 | 25 ± 4 |
| Water | 35 | 56 ± 2 | 65 ± 4 | 21 ± 4 | 19 ± 3 |
| Water | 45 | 48 ± 5 | 60 ± 3 | 22 ± 3 | 20 × 1 |

[a]Fruit which were vacuum (3 kPa) infused with Spark-L HPG (enzyme 1) or Clarex-L (enzyme 2) solutions were incubated for 30 min. Fruit which were water infused were peeled immediately after infusion.
[b]Average time for four peeler (±SE).

TABLE 2

Effects of enzyme and infiltration method on peeling time of grapefruit and oranges.

| Infusion solution | Infiltration method | Peeling time (sec/fruit) | |
|---|---|---|---|
| | | White grapefruit | Hamlin orange |
| Enzyme[a] | Vacuum | 41 ± 3[b] | 16 ± 2 |
| Enzyme | Pressure | 48 ± 4 | 17 ± 3 |
| Water | Vacuum | 59 ± 7 | 20 ± 3 |

TABLE 2-continued

Effects of enzyme and infiltration method on peeling time of grapefruit and oranges.

| Infusion solution | Infiltration method | Peeling time (sec/fruit) | |
|---|---|---|---|
| | | White grapefruit | Hamlin orange |
| Water | Pressure | 53 ± 7 | 20 × 3 |

[a]Fruit which were vacuum (3 kPa) or pressure (207 kPa) infused with Spark-L HPG enzyme solution were incubated at 25° C. for 1 h or 30 min, respectively. Fruit which were vacuum or pressure fused with water were peeled immediately after infusion.
[b]Average time for four peeler (±SE).

Increasing the temperatures of the fruit and infusion solutions generally improved peeling time for both enzyme- and water-infused fruit (Table 1). Peeling fruit by water infusion at below ambient temperatures was possible, but sometimes hampered by incomplete hydration of the albedo. Tangelos in particular often had dry regions during low-temperature infusion, which slowed peeling and led to damage of the fruit. Temperature effects on enzyme efficacy may be readily explained by enzyme kinetics. Reduced efficacy of water at low temperatures may be related to reduced solubility, a factor that might be improved by incorporation of an adjuvant such as a surfactant.

Peeling times of fruit infusion by pressure and vacuum methods were not significantly different (Table 2). However, the pressure method often left regions the albedo unhydrated (about 5-25%).

It has been noted that fruit that were scored, but not infused with solution, could be peeled at rates similar to that of the infused fruit. However, these fruit were covered with thick layers of albedo that could not be removed. Comparisons of characteristics between solution-infused and noninfused fruit were not made because of this qualitative difference.

Juice Loss and Firmness Studies. Juice loss was determined 0, 1, 7, 14, 21, and 28 days after peeling by the difference in the weight of the container and juice in the presence or absence of the fruit.

Figure 4A:
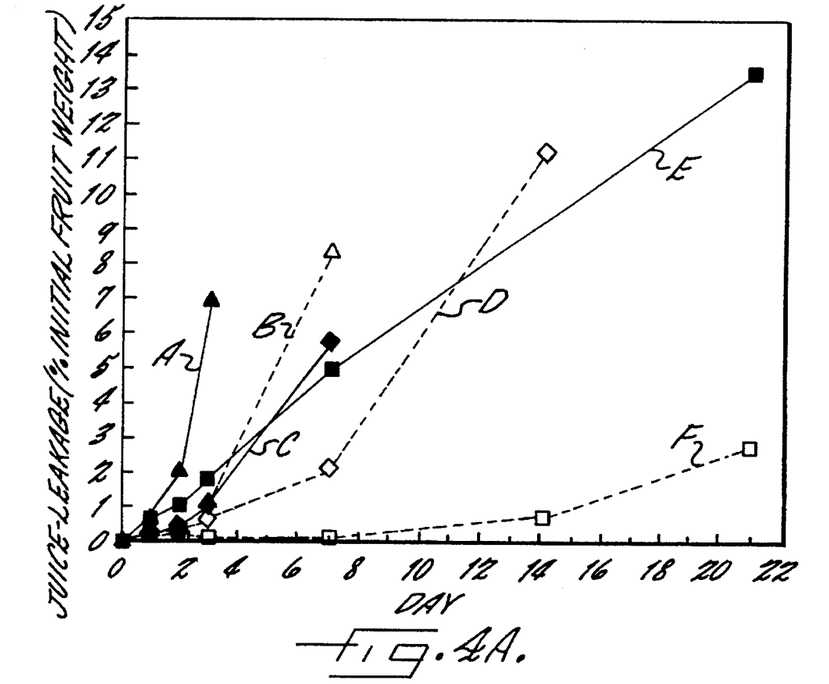
Figure 4B:
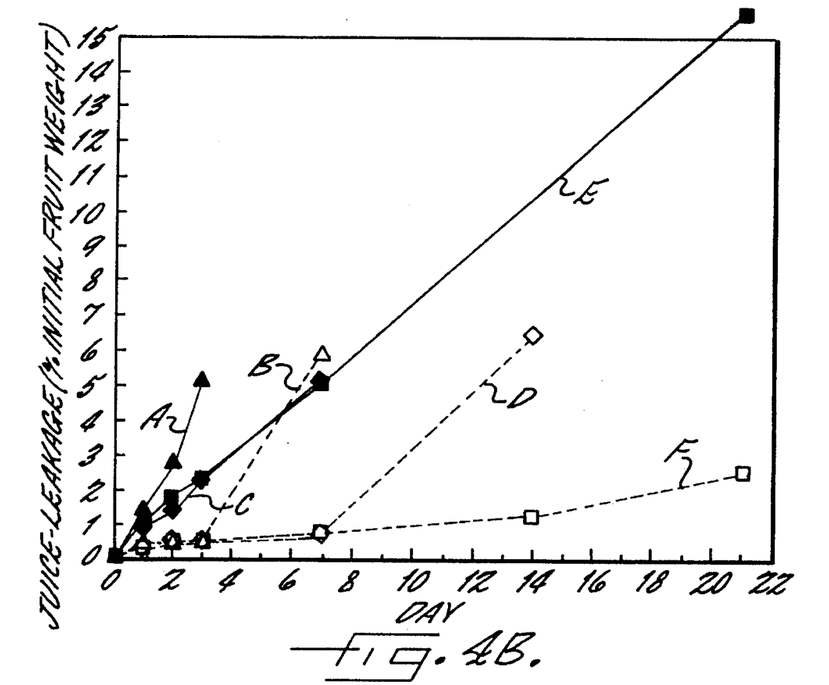

Juice loss was significantly greater for enzyme-infused fruit regardless of storage temperature (FIG. 4). Perhaps related was that firmness was perceptibly reduced even after 1 day of storage at 5° C. (Table 3). The extent of juice loss was not affected by infusion technique (data not shown).

Visual Appearance Studies. Visual appearance was assessed by triangle tests and paired comparisons to determine the appearance differential and preference, respectively, for solution compositions for fruit stored at 5° C. Visual evaluation was determined by a sensory panel of 20 judges 1 and 7 days after peeling. Fruit firmness was assessed by multiple comparison tests by a sensory panel of 9 experienced judges 1 and 7 days after peeling.

Sensory panel evaluation indicated that differences between enzyme- and water-infused fruit could be distinguished as early as 1 day after peeling (Table 4). Of those judges correctly able to differentiate the treatment difference, their preference was given to water-vacuum-infused oranges 7 days after peeling. Comments made by the judges typically reflected that the enzyme-treated fruit appeared "slimy" and thus less desirable. Other preferential comparison tests did not yield significant results.

TABLE 3

Effects of enzyme and infiltration method on firmness of peeled grapefruit and oranges.

| | | Firmness[a] | | | |
|---|---|---|---|---|---|
| | | Day 1 | | Day 7 | |
| Infusion solution | Infiltration method | White grape-fruit | Hamlin orange | White grape-fruit | Hamlin orange |
| Enzyme[b] | Vacuum | 3.7 ± 0.2 | 4.3 ± 0.4 | 2.6 ± 0.3 | 2.4 ± 0.3 |
| Enzyme | Pressure | 3.9 ± 0.3 | 4.8 ± 0.5 | 2.3 ± 0.3 | 3.1 ± 0.4 |
| Water | Vacuum | 5.3 ± 0.2 | 4.6 ± 0.5 | 4.1 ± 0.3 | 4.0 ± 0.3 |
| Water | Pressure | 5.0 ± 0.0 | 5.0 ± 0.0 | 4.6 ± 0.3 | 4.7 × 0.2 |

[a]Firmness was rated from 0 (firm) to 5 (soft) by sensory panel after 1 and 7 days in storage at 5° C.
[b]Fruit which were vacuum (3 kPa) or pressure (207 kPa) infused with Spark-L HPG enzyme solution were incubated at 25° C. for 1 h or 30 min, respectively. Fruit which were vacuum or pressure fused with water were peeled immediately after infusion.
[c]Average scored by nine experienced judges (±SE).

TABLE 4

Effects of enzyme treatment on the visual appearance of peeled grapefruit and orange.

| | | Day 1 | | Day 7 | |
|---|---|---|---|---|---|
| | | Differ-ential[a] | Prefer-ential[b] | Differ-ential | Prefer-ential |
| Hamlin | Vacuum[c] | *** | N.S. | *** | * |
| | Pressure | *** | N.S. | *** | N.S. |
| Grapefruit | Vacuum | N.S. | N.S. | * | N.S. |
| | Pressure | N.S. | N.S. | *** | N.S. |

[a]Determination of the ability to differentiate between fruit peeled by water and enzyme infusion methods (triangle test evaluation where $p \leq 0.05 = *$, $0.01 = $, and $0.001 = *$).
[b]Preferential test based of fruit peeled by water infusion preference over fruit peeled by enzyme infusion.
[c]Fruit which were vacuum (3 kPa) or pressure (207 kPa) infused with Spark-L HPG enzyme solution were incubated at 25° C. for 1 h or 30 min, respectively. Fruit which were vacuum or pressure fused with water were peeled immediately after infusion.

Microbial Stability Studies. The microbial stability of packaged and peeled citrus was evaluated at 0, 1, 7, 14, 21, and 28 days after peeling for fruit stored at 5°, 10°, or 15° C. by known procedures. Briefly, triplicated samples of each treatment were macerated at each evaluation time. Appropriate dilutions of each sample were plated in duplicate on orange serum agar (OSA) and acidified potato dextrose sugar (PDA). Plates were incubated for 48 h at 35° C. (OSA) and 5 days at 25° C. (PDA), and the number of aerobic organisms and yeasts and molds was determined.

Figure 5A:
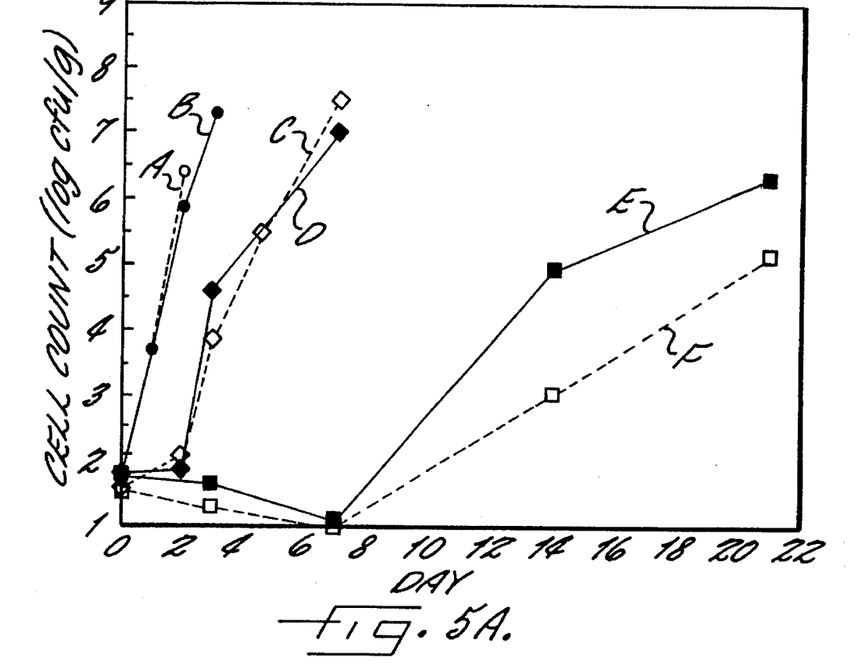
Figure 5B:
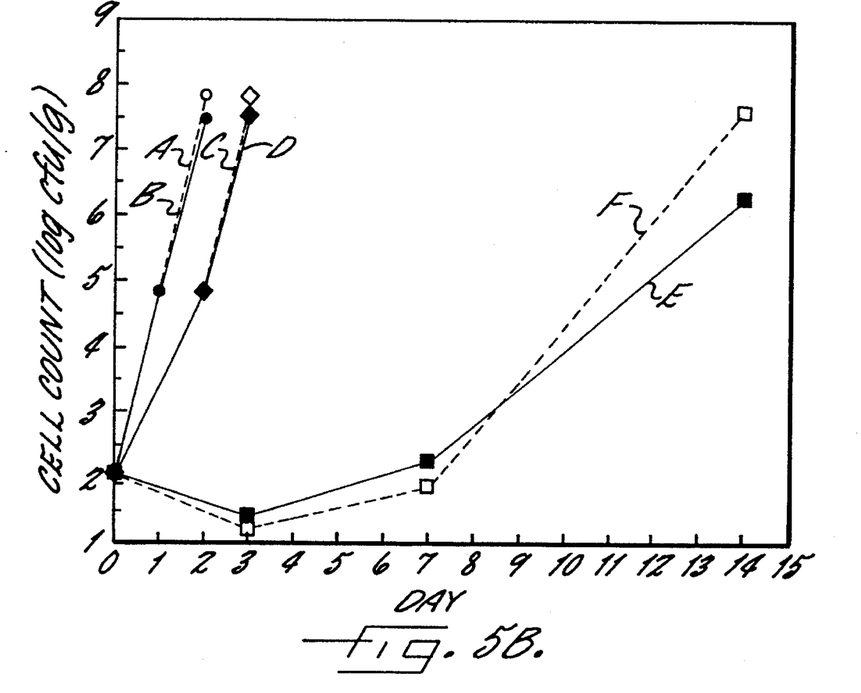

The infusion solution composition did not significantly affect microbial stability (FIG. 5). Based on the criterion that the microbial level should not exceed 5 log cfu/g of fruit, the maximum shelf life of peeled grapefruit and oranges is estimated to be about 10, 3, and 1 days for fruit stored at 5°, 10°, and 15° C. Fruit stored at 25° C. exceed this level before 1 day after storage.

Respiration-Rate Studies. The effect of solution composition on respiration rate was determined by packaging infused citrus in 25 μm low-density polyethylene, holding the fruit at 5° C., measuring steady-state $O_2$ and $CO_2$, and determining respiration rates. Gas samples (0.5 ml) were taken by syringe through a silicone septum and injected into a flow-through analysis system consisting of a Servomex 570A paramagnetic $O_2$ analyzer (Servomex, Inc., Norwood, Mass. and an Anarad AR-400 infrared $CO_2$ analyzer (Anarad, Inc., Santa Barbara, Calif.) connected in series with a $N_2$ carrier gas.

Respiration rates for white grapefruit were 1.2 and 1.1 mmol $O_2$/kg/h for water-and enzyme-infused white grapefruit, respectively, and 0.8 and 0.9 mmol $O_2$/kg/h for water- and enzyme-infused oranges, respectively, for fruit stored at 5° C.

Ethylene Emanation Studies. Ethylene emanation was measured by sampling the package headspace and with a gas chromatograph HP 5780 (Hewlett Packard, Danbury, Conn.).

Ethylene levels in the package headspace were 0.1 ppm or less for all treatments. These results suggest that while the enzyme promotes water loss, it does not stimulate a wound response. While the precise prolonged effect of enzyme on the fruit is not known, it appears the damage is slow and general. Further refinement of enzymatic peeling techniques may benefit from a determination of the precise mechanisms of fruit degradation.

In summary, then, the benefits of water infusion over enzyme infusion for pretreating citrus fruit include:

1. The fruit using water infusion are firmer, lose less juice, and have a better appearance than enzymatically peeled fruit.
2. The water-infusion method is simpler because there is no solution to prepare and monitor, no incubation period, and no temperature control necessary. The absence of the incubation time may provide additional benefits to the fruit in that the hydrated peel is likely to prevent adequate gas exchange to the flesh. Eliminating the incubation period would shorten the period of possible anaerobic respiration.
3. The water-infusion method is cheaper since there is no enzyme to purchase.

Finally, regions of dry albedo were observed after infusion, particularly when fruit had been infused by pressure or at low temperatures, had substantial internal air spaces, or had slightly desiccated peels. If the peels were not sufficiently hydrated, peeling was difficult or impossible, regardless of the presence of enzyme.

Embodiment Two

Figure 6A:
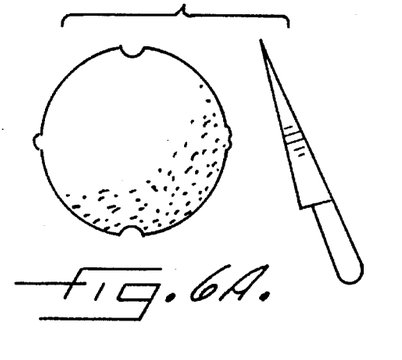
Figure 6B:
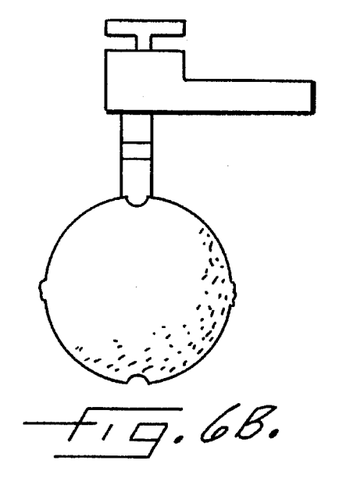
Figure 6C:
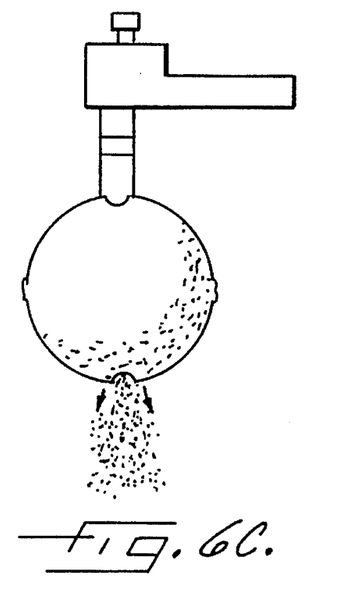

The second method for pretreating a citrus fruit for facilitating peeling, as shown in FIG. 6, comprises the steps of making a first hole and a second hole or cut in the cuticle of the fruit [FIG. 6(a)] and applying a water tube to the first hole [FIG. 6(b)]. Preferably the tube should have a radius dimensioned to closely engage the first hole. The fruit is then infused with a solution comprising water having essentially no enzyme therein from the tube at a sufficient pressure that the solution exits from the second hole and cut [FIG. 6(c)].

In a preferred embodiment, the first hole and the second hole or cut are generally radially opposed from each other, and further are positioned at an angle of generally 90 degrees away from a blossom end of the fruit. Diameters of 0.5–2 cm have been found to be adequate for the first hole.

As can be seen in FIG. 6(c), as the infusion is performed with water pressure, typically the peel of the fruit is radially expanded, "ballooning out", hydrating and thereby separating the peel from the fruit segments.

It has been found that sufficient pressure to accomplish this method can be achieved when the water tube comprises a tube extending from a water faucet.

This embodiment is beneficial with fruit that typically remain dry, and also for in-home processing of fruit or for the pretreatment of fruit on an assembly line.

It may be appreciated by one skilled in the art that additional embodiments may be contemplated, including the use of this method for other fruits and vegetables.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for pretreating a citrus fruit for facilitating peeling, the fruit having fruit segments surrounded by a peel comprising a cuticle and an albedo, the method comprising the steps of:

making a first and a second hole in the cuticle of the fruit;

applying a water tube to the first hole, the tube having a radius dimensioned to closely engage the first hole; and infusing the fruit with a solution comprising water having essentially no enzyme therein from the tube at a sufficient pressure that the solution exits from the second hole, the solution under pressure causing the peel to expand radially and thereby to separate the peel from the fruit segments.

2. The method recited in claim 1, wherein the first and the second hole are generally radially opposed from each other.

3. The method recited in claim 2, wherein the first and the second hole are positioned a solid angle of generally 90 degrees away from a blossom end of the fruit.

4. The method recited in claim 1, wherein the water tube comprises a tube extending from a water faucet.

5. The method recited in claim 1, wherein the first and the second hole have diameters generally in the range of 0.5–2 cm.

6. A method for pretreating a citrus fruit for facilitating peeling, the fruit having fruit segments surrounded by a peel comprising a cuticle and an albedo, the method comprising the steps of:

making a hole and a cut in the cuticle of the fruit;

applying a water tube to the hole, the tube having a radius dimensioned to closely engage the hole; and infusing the fruit with a solution comprising water having essentially no enzyme therein from the tube at a sufficient pressure that the solution exits from the cut, the solution under pressure causing the peel to expand radially and thereby to separate the peel from the fruit segments.

\* \* \* \* \*

UNITED STATES PATENT AND TRADEMARK OFFICE
CERTIFICATE OF CORRECTION

PATENT NO. : 5,560,951
DATED : October 1, 1996
INVENTOR(S) : Shi-Chiang Pao, Peter D. Petracek and G. Eldon Brown It is certified that error appears in the above-indentified patent and that said Letters Patent is hereby corrected as shown below:

On the title page, item [73]

Strike "Assignee: University of South Florida, Tampa, Florida" and insert
--Assignee: Florida Department of Citrus, Lakeland, Florida--.

Signed and Sealed this

Twenty-eighth Day of July, 1998

Attest:

BRUCE LEHMAN

*Attesting Officer*  *Commissioner of Patents and Trademarks*